(12) United States Patent
Takabayashi et al.

(10) Patent No.: US 8,906,463 B2
(45) Date of Patent: Dec. 9, 2014

(54) METHOD FOR PRODUCING POLYIMIDE FILM AND POLYAMIC ACID SOLUTION COMPOSITION

(75) Inventors: Seiichirou Takabayashi, Ube (JP); Tooru Murakami, Ube (JP)

(73) Assignee: Ube Industries, Ltd., Yamaguchi (JP)

( * ) Notice: Subject to any disclaimer, the term of this patent is extended or adjusted under 35 U.S.C. 154(b) by 490 days.

(21) Appl. No.: 12/301,486

(22) PCT Filed: May 18, 2007

(86) PCT No.: PCT/JP2007/060217
§ 371 (c)(1),
(2), (4) Date: Nov. 19, 2008

(87) PCT Pub. No.: WO2007/135982
PCT Pub. Date: Nov. 29, 2007

(65) Prior Publication Data
US 2010/0291377 A1    Nov. 18, 2010

(30) Foreign Application Priority Data

May 19, 2006  (JP) ................................. 2006-139757

(51) Int. Cl.
*B05D 3/02* (2006.01)
*C08G 73/10* (2006.01)
*C09D 179/08* (2006.01)

(52) U.S. Cl.
CPC ............ *C08G 73/1042* (2013.01); *C08G 73/10* (2013.01); *C09D 179/08* (2013.01)
USPC ....................................... 427/385.5; 427/384

(58) Field of Classification Search
CPC ... C08G 73/10; C08G 73/1042; C09D 179/08
USPC ............................................. 427/384, 385.5
See application file for complete search history.

(56) References Cited

U.S. PATENT DOCUMENTS

| 5,261,977 | A | 11/1993 | Powell |
| 5,308,569 | A | 5/1994 | Hamamoto et al. |
| 5,868,949 | A | 2/1999 | Sotokawa et al. |

FOREIGN PATENT DOCUMENTS

| EP | 1 275 681 | 1/2003 |
| EP | 1 867 675 | 12/2007 |
| JP | 55-7805 | 1/1980 |
| JP | 5-25295 | 2/1993 |
| JP | 7-307114 | 11/1995 |
| JP | 8-134212 | 5/1996 |
| JP | 8-134232 | 5/1996 |
| JP | 11-80352 | 3/1999 |
| JP | 2003-64196 | 3/2003 |

OTHER PUBLICATIONS

Database WPI Week 200574 Thomson Scientific, London, GB; AN 2005-725226 XP002523844 & WO 200/085333 A (Kanegafuchi Chem Ind Co Ltd) dated Sep. 15, 2005.
Database WPI Week 200458 Thomson Scientific, London, GB; AN 2004-604080 XP002523845 & WO 2004/062873 A (Teijin Ltd) dated Jul. 29, 2004.
European Patent Office issued a European Search Report dated Apr. 16, 2009, Application No. 07 74 3652.
Chinese Office Action dated Jan. 25, 2011 in corresponding Chinese Application No. 200780018269.0 with English translation of Chinese Office Action.
Japanese Official Action—2007-134608—Oct. 25, 2011.
Taiwanese Office Action dated Jan. 14, 2013 in corresponding Taiwanese Patent Application No. 096117827 with English translation of Taiwanese Office Action.

*Primary Examiner* — Robert S Walters, Jr.
(74) *Attorney, Agent, or Firm* — Young & Thompson

(57) ABSTRACT

Disclosed is a method for producing a polyimide film, wherein a polyamic acid solution composition is coated on a base material and the resultant coating film is processed by heat treatment; the polyamic acid solution composition is obtained by introducing a specific chemical structure into a polyamic acid at a ratio within a specific range; and the polyamic acid has a chemical structure composed of a 3,3',4,4'-biphenyltetracarboxylic acid component and/or a pyromellitic acid component, and a paraphenylenediamine component. Also disclosed is the polyamic acid solution composition.

13 Claims, No Drawings

METHOD FOR PRODUCING POLYIMIDE FILM AND POLYAMIC ACID SOLUTION COMPOSITION

TECHNICAL FIELD

The present invention relates to a method for producing a polyimide film having excellent heat resistance and a large thickness, and to a polyamic acid solution composition suitably used in the method.

BACKGROUND ART

Polyimide composed of 3,3',4,4'-biphenyltetracarboxylic dianhydride (hereinafter may also be abbreviated as s-BPDA) and paraphenylenediamine (hereinafter may also be abbreviated as PPD), which is described, for example, in Patent Document 1, is used in various applications because of excellent heat resistance and mechanical properties.

Further, in Patent Document 2, a method for producing polyimide having excellent heat resistance and mechanical properties composed of pyromellitic dianhydride (hereinafter may also be abbreviated as PMDA) and PPD is described.

Patent Document 1: JP 55-7805A
Patent Document 2: JP 2003-64196A

DISCLOSURE OF THE INVENTION

As mentioned above, a polyimide film composed of s-BPDA or PMDA and PPD is quite useful in various applications because the polyimide film has excellent heat resistance and mechanical properties. However, when an attempt was made to prepare a thick polyimide film by a method in which a polyamic acid solution composition composed of s-BPDA or PMDA and PPD was coated on a base material and the resultant coating film was processed by heat treatment, it was not easy to obtain the polyimide film because foaming occurred in the course of the heat treatment. It is an object of the present invention to provide a method for producing easily, without foaming, a thick polyimide film that has excellent heat resistance and mechanical properties similar to the polyimide film composed of s-BPDA or PMDA and PPD by a method in which a polyamic acid solution composition is coated on a base material and the resultant coating film is processed by heat treatment, and to provide a polyamic acid is solution composition suitably used in the production method.

Namely, the present invention relates to a method for producing a polyimide film comprising the step of heating a coating film formed by coating, on a base material, a solution composition composed of a polyamic acid having a repeating unit represented by the following chemical formula (1) thereby to obtain a polyimide film having a thickness of 40 to 120 μm without foaming.

[Formula 1]

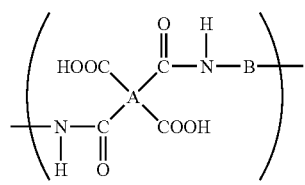

Chemical Formula (1)

In the polyamic acid having the repeating unit represented by the chemical formula (1), 75 mol % or more in 100 mol % of A is the following chemical formula (2) and/or chemical formula (3); 75 mol % or more in 100 mol % of B is the following chemical formula (4); 175 mol % or more in 200 mol % of A plus B is any of the following chemical formulas (2) to (4); and 6 to 25 mol % in 200 mol % of A plus B is any of the following chemical formulas (5) to (7).

[Formula 2]

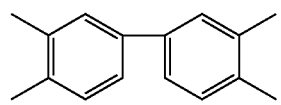

Chemical Formula (2)

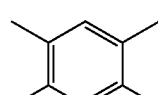

Chemical Formula (3)

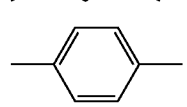

Chemical Formula (4)

[Formula 3]

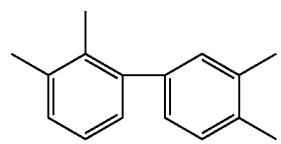

Chemical Formula (5)

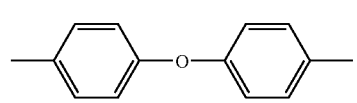

Chemical Formula (6)

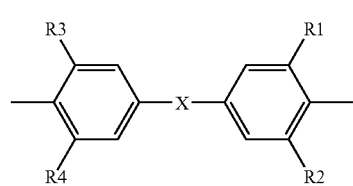

Chemical Formula (7)

In the chemical formula (7), X is direct bonding or a divalent group; R1 to R4 each are a substituent selected from hydrogen atom, a hydrocarbon group having 1 to 6 carbon atoms, hydroxyl group, carboxyl group, an alkoxy group having 1 to 6 carbon atoms, and a carboalkoxy group; at least one of R1 and R2 is not hydrogen atom; and at least one of R3 and R4 is not hydrogen atom.

Further, the present invention relates to the method for producing a polyimide film, wherein the resultant polyimide film has a water vapor permeation coefficient of 0.15 g·mm/m²/24 hr or more and an elastic modulus of 500 MPa or more at 400° C.

Still further, the present invention relates to the method for producing a polyimide film, wherein, in the polyamic acid having the repeating unit represented by the chemical formula (1), 85 mol % or more in 100% of A is the chemical formula (2) and/or chemical formula (3), 85 mol % or more in 100% of B is the chemical formula (4), 175 mol % or more in 200% of A plus B is any of the chemical formulas (2) to (4), and 6 to 25 mol % in 200% of A plus B is any of the chemical formulas (5) to (7). Still further, the present invention relates to the method for producing a polyimide wherein the resultant polyimide film has a water vapor permeation coefficient of 0.15 g·mm/m²/24 hr or more and an elastic modulus of 750 MPa or more at 400° C., and to a polyimide film produced by the method for producing the polyimide film.

Still further, the present invention relates to a polyamic acid solution composition composed of a polyamic acid having a repeating unit represented by the following chemical formula (1).

[Formula 4]

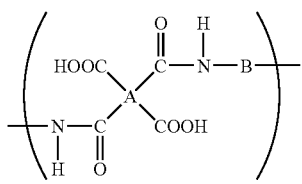

Chemical Formula (1)

In the polyamic acid having the repeating unit represented by the chemical formula (1), 75 mol % or more in 100 mol % of A is the following chemical formula (2) and/or chemical formula (3); 75 mol % or more in 100 mol % of B is the following chemical formula (4); 175 mol % or more in 200 mol % of A plus B is any of the following chemical formulas (2) to (4); and 6 to 25 mol % in 200 mol % of A plus B is any of the following chemical formulas (5) to (7).

[Formula 5]

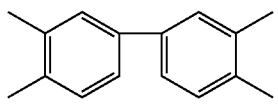

Chemical Formula (2)

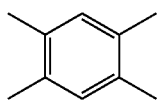

Chemical Formula (3)

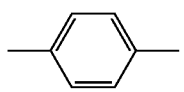

Chemical Formula (4)

[Formula 6]

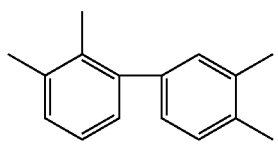

Chemical Formula (5)

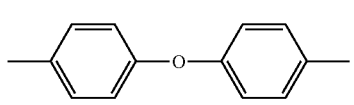

Chemical Formula (6)

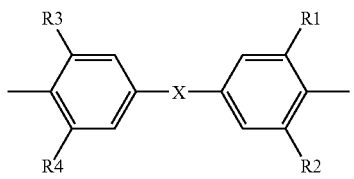

Chemical Formula (7)

In the chemical formula (7), X is direct bonding or a divalent group; R1 to R4 each are a substituent selected from hydrogen atom, a hydrocarbon group having 1 to 6 carbon atoms, hydroxyl group, carboxyl group, an alkoxy group having 1 to 6 carbon atoms, and a carboalkoxy group; at least one of R1 and R2 is not hydrogen atom; and at least one of R3 and R4 is not hydrogen atom.

In addition, the present invention relates to a polyamic acid solution composition that has an excellent solution stability and provides, without foaming, a 40 to 120 μm thick polyimide film by heating a coating film formed on a base material, wherein the polyimide film has a water vapor permeation coefficient of 0.15 g·mm/m²/24 hr or more and an elastic modulus of 500 MPa or more at 400° C.

Note that, the foregoing "excellent solution stability" is defined as follows: when the change in the solution viscosity (rotational viscosity) of an N-methyl-2-pyrrolidone solution dissolving 20% by mass of a polyamic acid is measured with an E-type viscometer at 30° C., the percent change in the solution viscosity obtained by using the following equation is ±10% or less, Percent change (%)={$(P2-P1)/P1$}×100, wherein P1 denotes the solution viscosity of the polyamic acid solution immediately after preparation; and P2 denotes the solution viscosity measured after the solution is left over for 30 days in an atmosphere of 30° C.

A thick polyimide film having excellent heat resistance and mechanical properties can be easily produced without foaming by the method according to the present invention, in which a coating film prepared by coating a polyamic acid solution composition on a base material is processed by heat treatment. In this way, the method can be easily applied to an application, in which it is required to form a thick polyimide film having excellent heat resistance and mechanical properties on the surface of a base material, including, for example, an overcoat film for electrical and electronic components, a surface protection film for sliding parts, a copper-clad laminate board obtained by forming a polyimide film on the surface of copper foil such as a bilayer CCL, and a seamless belt obtained by applying the method to the centrifugal molding.

BEST MODE FOR CARRYING OUT THE INVENTION

The polyamic acid solution composition used in the present invention will be described first. The polyamic acid solution composition used in the present invention contains, as a polyimide precursor, a polyamic acid that has a repeating unit represented by the following chemical formula (1).

[Formula 7]

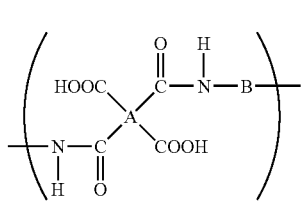

Chemical Formula (1)

In a polyamic acid having the repeating unit represented by the chemical formula (1), 75 mol % or more (preferably 85 mol % or more) in 100 mol % of A is the following chemical formula (2) and/or chemical formula (3); 75 mol % or more (preferably 85 mol % or more) in 100 mol % of B is the following chemical formula (4); 175 mol % or more in 200 mol % of 100 mol % of A plus 100 mol % of B is any of the following chemical formulas (2) to (4); and 6 to 25 mol % in 200 mol % of 100 mol % of A plus 100 mol % of B is any of the following chemical formulas (5) to (7).

[Formula 8]

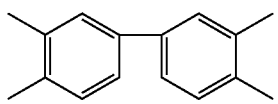

Chemical Formula (2)

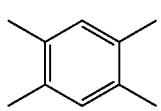

Chemical Formula (3)

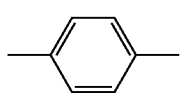

Chemical Formula (4)

[Formula 9]

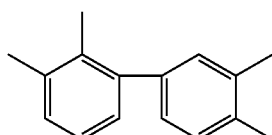

Chemical Formula (5)

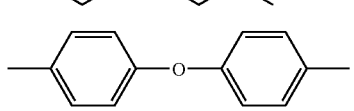

Chemical Formula (6)

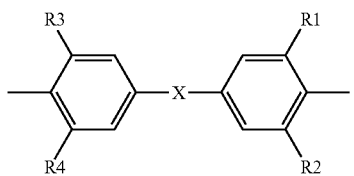

Chemical Formula (7)

In the chemical formula (7), X is direct bonding or a divalent group; R1 to R4 each are a substituent selected from hydrogen atom, a hydrocarbon group having 1 to 6 carbon atoms, hydroxyl group, carboxyl group, an alkoxy group having 1 to 6 carbon atoms, and a carboalkoxy group; at least one of R1 and R2 is not hydrogen atom; and at least one of R3 and R4 is not hydrogen atom.

Namely, the polyamic acid solution composition used in the present invention can be easily prepared by reacting in an organic solvent a tetracarboxylic acid component and a diamine component in a quasi equi-molar ratio (usually in a tetracarboxylic acid component/diamine component molar ratio of 1.05 to 0.95), wherein 75 mol % or more (preferably 85 mol % or more) in 100 mol % of the tetracarboxylic acid component is 3,3',4,4'-biphenyltetracarboxylic acid and/or pyromellitic acid (or their acid dianhydrides or esters with alcohols, particularly acid dianhydrides); 75 mol % or more (preferably 85 mol % or more) in 1.00 mol % of the diamine component is paraphenylenediamine; 175 mol % or more in 200 mol % of 100 mol % of the tetracarboxylic acid component plus 100 mmol % of the diamine component is 3,3',4,4'-biphenyltetracarboxylic acid and/or pyromellitic acid (or their acid dianhydrides or esters with alcohols, particularly acid dianhydrides) and paraphenylenediamine; and 6 to 25 mol % in 200 mol % of 100 mol % of the tetracarboxylic acid component plus 100 mol % of the diamine component is any or a mixture of 2,3,3',4'-biphenyltetracarboxylic acid (or their acid dianhydrides or esters with alcohols, particularly acid dianhydrides), 4,4'-diaminodiphenyl ether, and a diamine represented by the following chemical formula (8).

Regarding 3,3',4,4'-biphenyltetracarboxylic acid and pyromellitic acid (or their acid dianhydrides or esters with alcohols, particularly acid dianhydrides) that share 75 mol % or more (preferably 85 mol % or more) in 100 mol % of the tetracarboxylic acid component, either one may be used solely or their mixture may be used, but in the case of using their mixture, 3,3',4,4'-biphenyltetracarboxylic acid (or their dianhydrides or esters with alcohols, particularly acid dianhydrides) is preferably 60 mol % or more in their mixture and particularly 80 mol % or more. Further, it is preferable that 3,3',4,4'-biphenyltetracarboxylic acid (or their dianhydride or alcohol ester, particularly acid dianhydride) is used solely.

[Formula 10]

Chemical Formula (8)

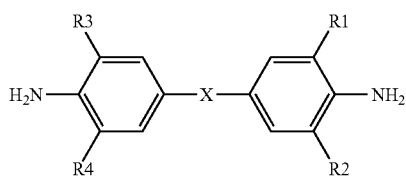

Note that, in the chemical formula (8), X is direct bonding or a divalent group; R1 to R4 each are a substituent selected from hydrogen atom, a hydrocarbon group having 1 to 6 carbon atoms, hydroxyl group, carboxyl group, an alkoxy group having 1 to 6 carbon atoms, and a carboalkoxy group; at least one of R1 and R2 is not hydrogen atom; and at least one of R3 and R4 is not hydrogen atom.

X in the chemical formula (8) includes a divalent cross-linking group such as oxygen atom, sulfur atom, methylene group, carbonyl group, sulfoxyl group, sulfone group, 1,1'-ethylidene group, 1,2-ethylidene group, 2,2'-isopropylidene group, 2,2'-hexafluoroisopropylidene group, cyclohexylidene group, phenylene group, 1,3-phenylenedimethylene group, 1,4-phenylenedimethylene group, 1,3-phenylenediethylidene group, 1,4-phenylenediethylidene group, 1,3-phenylenedipropylidene group, 1,4-phenylenedipropylidene group, 1,3-phenylenedioxy group, 1,4-phenylenedioxy group, biphenylenedioxy group, methylenediphenoxy group, ethylidenediphenoxy group, propylidenediphenoxy group, hexafluoropropylidenediphenoxy group, oxydiphenoxy group, thiodiphenoxy group, sulfone diphenoxy group, and the like, but may also be direct bonding instead of the divalent cross-linking group.

In the chemical formula (8), R1 to R4 each are a substituent selected from is hydrogen atom, a hydrocarbon group having 1 to 6 carbon atoms, hydroxyl group, carboxyl group, an alkoxy group having 1 to 6 carbon atoms, and a carboalkoxy group, at least one of R1 and R2 is not hydrogen atom, and at least one of R3 and R4 is not hydrogen atom.

R1 to R4 include: (a) a combination in which R1 to R4 each are a substituent selected from a hydrocarbon group having 1 to 6 carbon atoms, hydroxyl group, carboxyl group, an alkoxy group having 1 to 6 carbon atoms, and a carboalkoxy group; (b) a combination in which R1 to R3 are a substituent selected from a hydrocarbon group having 1 to 6 carbon atoms, hydroxyl group, carboxyl group, an alkoxy group having 1 to 6 carbon atoms, and a carboalkoxy group, and only R4 is hydrogen atom; and (c) a combination in which R1 and R3 each are a substituent selected from a hydrocarbon group having 1 to 6 carbon atoms, hydroxyl group, carboxyl group, an alkoxy group having 1 to 6 carbon atoms, and a carboalkoxy group, and R2 and R4 each are hydrogen atom.

The specific examples of R1 to R4 include hydrogen; a hydrocarbon group such as methyl group, ethyl group, n-propyl group, i-propyl group, n-butyl group, s-butyl group, i-butyl group, t-butyl group, pentyl group, cyclohexyl group, phenyl group, and the like; hydroxyl group; an alkoxy group such as methoxy group, ethoxy group, propoxy group, butoxy group, and the like; carboxyl group; and a carboalkoxy group such as carbomethoxy group, carboethoxy group, carbopropoxy group, carbobutoxy group, and the like. R1 to R4 may be the same or different from each other.

Further in the chemical formula (8), preferably X is direct bonding or a cross-linking group, and R1 to R4 each are a substituent selected from a hydrocarbon group having 1 to 6 carbon atoms.

The specific examples of a diamine represented by the chemical formula (8) include 3,3',5,5'-tetramethyl-4,4'-diaminobiphenyl, 3,3',5,5'-tetramethyl-4,4'-diaminodiphenyl ether, 3,3',5,5'-tetramethyl-4,4'-diaminodiphenylmethane, 3,3',5,5'-tetraethyl-4,4'-diaminobiphenyl, 3,3'5,5'-tetraethyl-4,4'-diaminodiphenyl ether, 3,3',5,5'-tetraethyl-4,4'-diaminodiphenylmethane, 4,4'-methylene-bis(2,6-diisopropylaniline), 3,3'-dicarboxy-4,4'-diamino-5,5'-dimethyldiphenylmethane, 3,3'-dimethyl-4,4'-diaminobiphenyl, 3,3'-diethyl-4,4'-diaminobiphenyl, 3,3'-dihydroxy-4,4'-diaminobiphenyl, 3,3'-dicarboxy-4,4'-diaminobiphenyl, 3,3'-dimethoxy-4,4'-diaminobiphenyl, 3,3'-dimethyl-4,4'-diaminodiphenyl ether, 3,3'-diethyl-4,4'-diaminodiphenyl ether, 3,3'-dihydroxy-4,4'-diaminodiphenyl ether, 3,3'-dicarboxy-4-4'-diaminodiphenyl ether, 3,3'-dimethoxy-4,4'-diaminodiphenyl ether, 3,3'-dimethyl-4,4'-diaminodiphenylmethane, 3,3'-diethyl-4,4'-diaminodiphenylmethane, 3,3'-dihydroxy-4,4'-diaminodiphenylmethane, 3,3'-dicarboxy-4,4'-diaminodiphenylmethane, 3,3'-dimethoxy-4,4'-diaminodiphenylmethane and the like, and is preferably 3,3',5,5'-tetramethyl-4,4'-diaminodiphenylmethane.

In the present invention, a polyamic acid solution composition obtained by incorporating the chemical structure of the chemical formulas (5) to (7) into the chemical structure of the chemical formulas (2) to (4) at a ratio within a specific range is used as a polyamic acid, and a coating film formed by coating the polyamic acid solution composition on a base material is heated. Thereby a polyimide film that is excellent in heat resistance and mechanical properties and is thick can be produced easily without foaming. As described above, when an attempt is made to produce a polyimide film having a thickness of 40 μm or more, for example, by heating a coating film prepared by coating on a metallic base material a polyamic acid solution composition obtained from 100 mol % of 3,3',4,4'-biphenyltetracarboxylic acid and/or pyromellitic acid (or their acid dianhydrides or esters with alcohols, particularly acid dianhydrides) and 100 mol % of paraphenylenediamine, a film of good quality cannot be obtained because of foaming in the course of heating. Further, when the chemical structure of the chemical formulas (5) to (7) is less than the range of the specific ratio, the foaming in the course of heating cannot be prevented. On the other hand, when the chemical structure of the chemical formulas (5) to (7) exceeds the range of the specific ratio, the heat resistance and the mechanical properties such as dimensional stability of the resultant polyimide film become lowered.

Note that, the polyamic acid used in the present invention is preferably a polyamic acid composed of only the chemical structure represented by the chemical formulas (2) to (7), but may include a small amount of a chemical structure other than those represented by the chemical formulas (2) to (7), for example, such as the one formed from an aromatic tetracarboxylic acid and an aromatic diamine that are used for an aromatic polyimide, as long as the effect of the present invention is secured.

For the preparation of the polyamic acid, known processes and conditions for the preparation of polyamic acid may be suitably used. Therefore, for example, though not specifically limited, the following process is suitably used, wherein a homogeneous polyamic acid solution is obtained by reacting the tetracarboxylic acid component and the diamine component in an organic solvent at a solid concentration of 5 to 40% by mass in terms of polyimide for 0.1 hour to several tens hours while stirring, at a temperature preferably at 100° C. or lower and more preferably 80° C. or lower in order to prevent imidization of the amide bond and the carboxyl group of the resultant polyamic acid.

The molecular weight of the polyamic acid, that possesses the repeating unit represented by the chemical formula (1) and is contained in the polyamic acid solution composition used in the present invention, is not particularly limited, but the number average molecular weight is 1,000 to 150,000 and preferably 10,000 to 150,000. The polyamic acid solution composition has good solution stability, but a part (usually up to about 10%) of the amide bond and the carboxyl group of the polyamic acid may be imidized as long as precipitation of polymer components or gellation does not occur and the solution is kept homogeneous.

The solvent used for the polyamic acid solution composition of the present invention is not particularly limited as long as the solvent dissolves the polyamic acid, but includes, for example, suitably a polar organic solvent such as N-methyl-2-pyrrolidone, N,N-dimethylformamide, N,N-dimethylacetamide, cresol, N,N-dimethyl sulfoxide, N-methyl caprolactam, methyl triglyme, methyl diglyme, and sulfolane. These solvents are suitably used at a polyamic acid solid concentration of 5 to 40% by mass, preferably 8 to 35% by mass, and more preferably 10 to 30% by mass in terms of polyimide. When the solid concentration is less than 5% by mass, a large amount of solvent is necessary and this is not cost-effective. When the solid concentration exceeds 40% by mass, handling or the like upon coating on a base material tends to become difficult because of high viscosity at room temperature.

In addition to the polyamic acid which is a polyimide precursor and the solvent that dissolves the polyamic acid, the polyamic acid solution composition used in the present invention may be mixed with fine inorganic fillers such as silica fine powders and the like, and if necessary may be further mixed with other mixing components. The other mixing components, although determined in accordance with applications and required performances, may suitably include organic solvents, plasticizers, weathering stabilizers, antioxidants, thermal stabilizers, lubricants, antistatic agents, brightening agents, colorants such as dyes and pigments, conductive materials such as carbon and metal powders, releasing agents, surface treatment agents, viscosity improvers, coupling agents, and surfactants. These mixing components may be mixed in advance in the solution composition or may be admixed upon its use. The inorganic fillers or the other mixing components are mixed in an amount of preferably 1 to 100% by mass and particularly preferably 1 to 60% by mass with respect to the solid content of polyamic acid in terms of polyimide.

As the organic solvent which is further mixed with the solution composition to dilute the solution composition of the present invention thereby to optimize the viscosity of the solution composition, an organic solvent that is non-reactive with but capable of dissolving or dispersing adequately each component of the solution composition is suitably selected.

Such solvents include N-methylformanilide, N-methylacetamide, N,N-dimethylacetamide, N-methyl-2-pyrrolidone, N,N-dimethyl sulfoxide, benzylethyl ether, dihexyl ether, acetonyl acetone, isophorone, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, phenyl cellosolve acetate, and the like.

The method for producing a polyimide film according to the present invention is characterized that coating film prepared by coating the polyamic acid solution composition on a base material is subjected to heat treatment on the base material to obtain a polyimide film having a thickness of 40 to 120 μm.

In the present invention, the base material is not particularly limited for form or material as long as a coating film can be formed by coating polyamic acid on the surface thereof and the base material has a dense structure through which liquid or gas does not substantially permeate. A film-forming base material such as a belt, a mold and a roll that are known as such and are used conventionally for producing films; a circuit board or an electronic component that has a surface on which a polyimide film serving as a protection film is formed; a component or a product such as a sliding component that has a surface on which a film is formed; and a counter film or copper foil used to produce a multi-layered film or a copper-clad laminate board by forming a polyimide film may be suitably included.

As the coating method for forming a coating film on the base material, for example, a method known in itself such as spraying, roll coating, spin coating, bar coating, ink-jet, screen printing, slit coating, and the like may be used appropriately.

The coating film formed on the base material by coating may be defoamed by heating it under a reduced pressure at a relatively low temperature.

The coating film composed of the polyamic acid solution composition and formed by coating on a base material is subjected to heat treatment for removing the solvent and imidization to form a polyimide film. The heat treatment may be performed suitably in a stepwise manner in which the solvent is removed at a relatively low temperature of 140° C. or less at first, then the temperature is elevated to the highest temperature of the heat treatment for imidization, rather than to perform the heat treatment at once at high temperature. In addition, the heat treatment is performed suitably at a temperature of 140° C. or higher for 0.01 to 30 hours, preferably 0.0.1 to 10 hours, and more preferably 0.01 to 6 hours, so that imidization proceeds in a manner such that substantially no amide acid group remains. The highest temperature for heat treatment is in the range of 300 to 600° C., preferably 350 to 550° C., and more preferably 380 to 450° C. Within this temperature range, the heat treatment is performed for 0.01 to 20 hours, preferably 0.01 to 6 hours, and more preferably 0.01 to 5 hours. An example of the condition for the heat treatment in which the temperature is elevated in such a stepwise manner includes the following condition: 30 minutes at 80° C., 10 minutes at 130° C., 10 minutes at 200° C., and finally 1.0 minutes at 400° C. (note that, the temperature is elevated in 10 minutes to a next heating step).

Further, in the case of forming a seamless belt or the like, for example, a polyimide film is formed adequately in the following manner, namely, a cylindrical mold is used as a base material, and a coating film of the polyamic acid solution composition is formed on the surface of the mold (inside or outside thereof) while the mold is rotated; the solvent is vaporized by heating at a temperature of 200° C. or lower to form a self-supporting film (in a state in which the solvent has been removed and the coating film loses fluidity, and polymerization and imidization are in progress, though not completely but to some extent); then the self-supporting film, as it is or if necessary after it is peeled off from the base material or turned back or while a tensile force is applied to the film appropriately, is heated under a condition where the temperature reaches the highest value of 300° C. to 600° C.

According to the method for producing a polyimide film of the present invention, a polyimide film having a thickness of 40 to 120 μm, preferably 45 to 110 μm, and more preferably 50 to 100 μm can be obtained without foaming. In addition, the resultant polyimide film has an elastic modulus of 500 MPa or more, preferably 750 MPa or more, and more preferably 1,000 MPa or more at a high temperature of 400° C., exhibiting an extremely high heat resistance. A polyimide film obtained by the method for producing a polyimide film according to the present invention as it is has excellent mechanical properties at room temperature, and does not steeply lower its mechanical strength at a high temperature of 400° C. because it does not have a glass transition temperature at 400° C. or less, thus keeping a high mechanical strength. These properties can be attained by combining a specific tetracarboxylic acid component and/or a specific diamine component with the tetracarboxylic acid component and diamine component, wherein 75 mol % or more (preferably 85 mol % or more) in 100 mmol % of the tetracarboxylic acid component is 3,3',4,4'-biphenyltetracarboxylic acid and/or pyromellitic acid (or their acid dianhydrides or esters with alcohols, particularly acid dianhydrides), 75 mol % or more (preferably 85 mol % or more) of 100 mol % of the diamine component is paraphenylenediamine, and 175 mol % or more in 200 mol % of the tetracarboxylic acid component plus the diamine component is 3,3',4,4'-biphenyltetracarboxylic acid and/or pyromellitic acid (or their acid dianhydrides or esters with alcohols, particularly acid dianhydrides) and paraphenylenediamine.

The polyimide film obtained according to the present invention has a tensile elastic modulus is 500 MPa or more at a high temperature of 400° C. This means that not only the strength is extremely excellent, but also dimensional stability is extremely excellent. That is, the polyimide film obtained according to the present invention exhibits such an excellent dimensional stability as: when measured in accordance with IPC-TM-650 method 2.2.4, the result of method B is 0.15% or less and the result of method C is 0.20% or less. In addition, adhesion to a copper foil base material is also excellent. Owing to these excellent properties, the present invention can be usefully applied to an overcoat film for electronic components, a copper-clad laminate board such as a bilayer CCL obtained by forming a polyimide film on the surface of copper foil, further a seamless belt obtained by applying the present invention to the centrifugal molding or the like, and others.

According to the method for producing a polyimide film of the present invention, a polyimide film having a thickness of 40 μm to 120 μm, preferably 45 μm to 110 μm, and more preferably 50 μm to 100 μm can be produced without foaming when a polyimide film is produced by heating a coating film formed by coating a polyamic acid solution composition on a base material. In addition, the resultant polyimide film exhibits high mechanical properties at room temperature and has a heat resistance of keeping a high elastic modulus of 500 MPa or more, preferably 750 MPa or more, and more preferably 1,000 MPa or more at a high temperature of 400° C.

Further, the polyimide film obtained by the method according to the present invention has a high water vapor permeation coefficient of 0.15 g·mm/m$^2$/24 hr or more while exhibiting an elastic modulus of 500 MPa or more, preferably 750 MPa or more, and more preferably 1,000 MPa or more at a high temperature of 400° C. High elastic modulus at high temperatures and high water vapor permeation coefficient are usually in a trade-off relationship. Because of this water vapor permeation performance, by-products such as water and the like are eliminated easily out of the film, wherein the by-products are produced in a coating film in the course of forming a polyimide film by heating the coating film composed of a polyamic acid solution composition formed on a base material. Presumably, this may be the reason why foaming is prevented even if the coating film composed of a polyamic acid solution composition formed on a base material is thick. Note that, when the thickness is less than 40 μm, even if the method of the present invention is not used in particular, a polyimide film having an elastic modulus of 500 MPa or more, preferably 750 MPa or more, and more preferably 1,000 MPa or more at a high temperature of 400° C. can be obtained without foaming. On the other hand, when the thickness exceeds 120 μm, foaming cannot be easily prevented even if the polyamic acid solution composition used in the present invention is used.

EXAMPLES

The present invention will be further described with reference to the following examples. However, it should be construed that the present invention is in no way limited to those examples.

Abbreviations of compounds used in the following examples are as follows:
s-BPDA: 3,3',4,4'-biphenyltetracarboxylic dianhydride,
a-BPDA: 2,3,3',4'-biphenyltetracarboxylic dianhydride,
PPD: paraphenylenediamine,
DADE: 4,4'-diaminodiphenyl ether, and
MDX: 3,3',5,5'-tetramethyl-4,4'-diaminodiphenylmethane (or, also refer to 4,4'-methylenedi-2,6-xylidine).

The measurement methods used in the following examples are as follows.

[Logarithmic Viscosity of Solution Composition]

Logarithmic viscosity ($\eta_{inh}$) was determined as follows: A solution dissolving a polyamic acid homogeneously in N-methyl-2-pyrrolidone in a manner that the polyamic acid concentration became 0.5 g/100 ml solvent was prepared, and the solution viscosity of the resultant solution and the solvent were measured at 30° C., respectively. The logarithmic viscosity was then calculated according to the following equation.

Logarithmic viscosity ($\eta_{inh}$)=ln(solution viscosity/ solvent viscosity)/solution concentration    [Equation 1]

[Solid Concentration]

The polyamic acid solution was dried at 350° C. for 30 minutes. The solid concentration of a polyamic acid solution was a value obtained by calculating from the weight W1 before drying and the weight W2 after drying according to the following equation.

Solid concentration (wt %)={($W1-W2$)/$W1$}×100

[Solution Stability]

Solution stability of a polyamic acid solution was evaluated by examining the change in the solution viscosity (rotational viscosity) measured with an E-type viscometer at 30° C. of an N-methyl-2-pyrrolidone solution prepared by dissolving 20% by mass of a polyamic acid. Namely, the percent change in the solution viscosity was calculated by the following equation using P1 that was the solution viscosity of a polyamic acid solution measured immediately after preparation and P2 that was the one measured after the solution was left over for 30 days in an atmosphere of 30° C. A percent change of ±10% or less was evaluated as "Good", while a percent change of ±10% or more was evaluated as "Poor".

Percent change (%)={($P2-P1$)/$P1$}×100

[Water Vapor Permeability]

The water vapor permeability of polyimide films, obtained from polyamic acid solutions and each having own thickness, was measured at 40° C. and 100% RH in accordance with JIS K7129B. Note that, in comparative examples, in the case where foaming occurred when polyimide films were produced, a film of polyamic acid after preliminary drying was peeled off from a base material and fixed on a metal frame. Then, the film was further heated while the film was prevented from shrinking by heating, and finally the resultant polyimide film having a thickness of 50 μm was subjected to the measurement.

[Elastic Modulus at 400° C.]

Polyimide films, each having own thickness, obtained from polyamic acid solutions were subjected to a viscoelasticity test. The 400° C. storage viscoelasticity was measured with a viscoelasticity analyzer for solids of RSAIII manufactured by TA Instruments Japan Corp. The polyimide films were cut into strip specimens having a width of 2 mm. The dimensions of the strip specimens were measured with a micrometer at 23° C. and their cross-sectional areas were determined. The measurement mode was as follows: stretch mode (dynamic measurement); sweep type was 3° C./step; soak time was 0.5 minute; frequency was 62.8 rad/sec (10 Hz); distortion was set to be 0.2%; temperature range was 25° C. to 500° C.; and the measurement was performed in a nitrogen gas stream atmosphere.

[90 Degree Peel Strength]

The 90 degree peel strength was measured for the laminates obtained in the examples and comparative examples in accordance with IPC-TM-650 method 2.4.9.

[Dimensional Stability]

The dimensional stability of the laminates with copper obtained in the examples and comparative examples were measured in accordance with IPC-TM-650 method 2.2.4. When the result of method B was 0.15% or less and the result of method C was 0.20% or less, it was evaluated as "Good". When the result of method B was 0.15% or more and the result of method C was 0.20% or more, it was evaluated as "Poor".

Example 1

In a glass reactor was added a predetermined amount of N-methyl-2-pyrrolidone as a solvent, and then added PPD, MDX, and s-BPDA in a ratio of 90 mol PPD and 10 mol MDX with respect to 100 mol s-BPDA. Then the mixture was stirred at 50° C. for 10 hours in a nitrogen gas stream to obtain a polyamic acid solution.

The resultant polyamic acid solution composition had a solid concentration of 18.5% by mass and a logarithmic viscosity $\eta_{inh}$ of 1.15. The solution stability thereof was evaluated as "Good".

The polyamic acid solution composition was coated on a lustrous surface of electrolytic copper foil having 35 μm thick using a bar coater in a manner that the thickness of the resulting polyimide film after curing became 75 μm, the film was defoamed and preliminarily dried under a reduced pressure of 100 mmHg at 100° C. for 30 minutes, and further heated in a hot air drier in a nitrogen gas atmosphere at 150° C. for 10 minutes, 250° C. for 10 minutes, and 400° C. for 10 minutes successively so as to form a polyimide film having a thickness of 50 μm on the copper foil base material.

The polyimide film prepared in the form of a laminate with copper foil was taken out of the hot air drier, and was inspected visually for the occurrence of foaming. Further, the copper foil was removed from the laminate by etching with a ferric chloride solution to obtain a polyimide film. Dimensional stability in the form of laminate with copper foil, adhesion between the polyimide film and copper foil (90 degree peel strength), the water vapor permeation coefficient of the polyimide film, and the elastic modulus at 400° C. were measured. The results are shown in Table 1.

Examples 2 to 7

In Examples 2 to 7, polyimide films were produced in the same manner as in Example 1, except that the composition of the polyamic acids was changed as shown in Table 1. The results are shown in Table 1.

Comparative Examples 1 to 7

In Comparative Examples 1 to 7, polyimide films were produced in the same manner as in Example 1, except that the composition of the polyamic acids was changed as shown in Table 1. The results are shown in Table 1.

TABLE 1

| | | Example | | | | | | |
|---|---|---|---|---|---|---|---|---|
| | | Ex. 1 | Ex. 2 | Ex. 3 | Ex. 4 | Ex. 5 | Ex. 6 | Ex. 7 |
| Polyamic acid composition | | | | | | | | |
| Acid component | s-BPDA (mol %) | 100 | 90 | 100 | 100 | 90 | 90 | 90 |
| | a-BPDA (mol %) | | 10 | | | 10 | 10 | 10 |
| Diamine component | PPD (mol %) | 90 | 100 | 90 | 80 | 90 | 90 | 90 |
| | DADE (mol %) | | | 10 | 20 | | | |
| | MDX (mol %) | 10 | | | | 10 | 10 | 10 |
| Polyamic acid solution composition | | | | | | | | |
| Logarithmic viscosity | | 1.15 | 1.16 | 1.17 | 1.14 | 1.21 | 1.21 | 1.21 |
| Solid concentration (% by mass) | | 18.5 | 18.6 | 18.5 | 18.5 | 18.4 | 18.4 | 18.4 |
| Rotational viscosity (Pa · s) | | 95 | 105 | 90 | 95 | 100 | 100 | 100 |
| Solution stability | | Good | Good | Good | Good | Good | Good | Good |
| Polyimide film | | | | | | | | |
| Thickness (μm) | | 75 | 85 | 80 | 55 | 50 | 75 | 95 |
| Water vapor permeability (g · mm/m²/24 hr) | | 0.25 | 0.26 | 0.16 | 0.21 | 0.3 | 0.35 | 0.4 |
| Elastic modulus at 400° C. (MPa) | | 1600 | 1100 | 1150 | 590 | 1500 | 1450 | 1250 |
| Film condition | | Good | Good | Good | Good | Good | Good | Good |
| Dimensional stability | | Good | Good | Good | Good | Good | Good | Good |
| 90 Degree peel strength (kg/cm) | | 0.8 | 1.1 | 0.7 | 0.9 | 0.8 | 0.9 | 0.8 |

| | | Comparative Example | | | | | | |
|---|---|---|---|---|---|---|---|---|
| | | Comp. Ex. 1 | Comp. Ex. 2 | Comp. Ex. 3 | Comp. Ex. 4 | Comp. Ex. 5 | Comp. Ex. 6 | Comp. Ex. 7 |
| Polyamic acid composition | | | | | | | | |
| Acid component | s-BPDA (mol %) | 100 | 100 | 100 | 100 | 100 | 60 | 95 |
| | a-BPDA (mol %) | | | | | | 40 | 5 |
| Diamine component | PPD (mol %) | 100 | | 50 | 95 | 95 | 100 | 100 |
| | DADE (mol %) | | 100 | 50 | 5 | | | |
| | MDX (mol %) | | | | | 5 | | |
| Polyamic acid solution composition | | | | | | | | |
| Logarithmic viscosity | | 0.75 | 0.68 | 0.69 | 1.16 | 1.22 | 1.05 | 1.15 |
| Solid concentration (% by mass) | | 18.5 | 18.3 | 18.4 | 18.3 | 18.4 | 18.2 | 18.4 |
| Rotational viscosity (Pa · s) | | 95 | 100 | 95 | 105 | 105 | 85 | 105 |
| Solution stability | | Good | Good | Good | Good | Good | Poor | Good |
| Polyimide film | | | | | | | | |
| Thickness (μm) | | 50 | 90 | 65 | 50 | 50 | 75 | 50 |
| Water vapor permeability (g · mm/m²/24 hr) | | 0.06 | 0.71 | 0.22 | 0.07 | 0.13 | 0.45 | 0.12 |
| Elastic modulus at 400° C. (MPa) | | ND | 4 | 45 | ND | ND | 275 | ND |
| Film condition | | Foamed | Good | Good | Foamed | Foamed | Good | Foamed |
| Dimensional stability | | ND | Poor | Poor | ND | ND | Good | ND |
| 90 Degree peel strength (kg/cm) | | ND | 1.2 | 0.9 | ND | ND | 1.1 | ND |

ND: Not determined

Industrial Applicability

According to the present invention, a thick polyimide film having excellent heat resistance and mechanical properties can be easily produced without foaming by a method of heating a coating film formed by coating a polyamic acid solution composition on a base material. Therefore, there can be easily applied to applications in which a thick polyimide film having excellent heat resistance and mechanical properties is required to be formed on the surface of a base material, including, for example, an overcoat film for electrical and electronic components, a surface protection film for sliding parts, a copper-clad laminate board such as a bilayer CCL obtained by forming a polyimide film on the surface of copper foil, and a seamless belt obtained by applying the method to the centrifugal molding or the like.

The invention claimed is:

1. A method for producing a polyimide film comprising:
heating a coating film formed on a base material, the coating film formed from a solution composition comprising a polyamic acid having a repeating unit represented by chemical formula (1), the coating film remaining coated on the base material during the heating and a maximum heating temperature being in a range of 380° C.-450° C.; and
obtaining a polyimide film without foaming, the film having a thickness of 40 to 120 μm and having an elastic modulus of 1,000 MPa or more at a temperature of 400° C.,

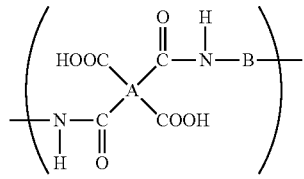

Chemical Formula (1)

wherein, in the polyamic acid having the repeating unit represented by the chemical formula (1),
85 mol % or more in 100 mol % of A is chemical formula (2) and/or chemical formula (3);
85 mol % or more in 100 mol % of B is chemical formula (4);
175 mol % or more in 200 mol % of A plus B is any of chemical formulas (2) to (4); and
6 to 25 mol % in 200 mol % of A plus B is any of chemical formulas (5) to (7);

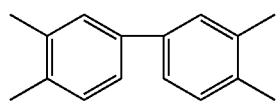

Chemical Formula (2)

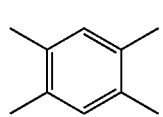

Chemical Formula (3)

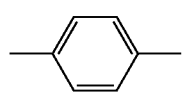

Chemical Formula (4)

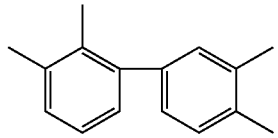

Chemical Formula (5)

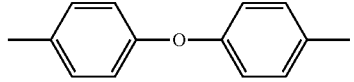

Chemical Formula (6)

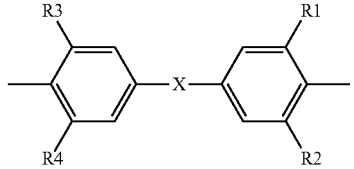

Chemical Formula (7)

and, in the chemical formula (7),
X is direct bonding or a divalent group;
R1 to R4 each independently are a substituent selected from hydrogen atom, a hydrocarbon group having 1 to 6 carbon atoms, hydroxyl group, carboxyl group, an alkoxy group having 1 to 6 carbon atoms, and a carboalkoxy group;
at least one of R1 and R2 is not hydrogen atom; and
at least one of R3 and R4 is not hydrogen atom.

2. The method for producing a polyimide film according to claim 1, wherein the polyimide film obtained by the method has a water vapor permeation coefficient of 0.15 g·mm/m²/24 hr or more.

3. The method for producing a polyimide film according to claim 1, wherein the polyimide film obtained by the method has a thickness of 45 to 110 μm.

4. The method for producing a polyimide film according to claim 1, wherein the polyimide film obtained by the method has a thickness of 50 to 100 μm.

5. The method for producing a polyimide film according to claim 1, wherein the polyamic acid has an average molecular weight of 1,000 to 150,000.

6. The method for producing a polyimide film according to claim 1, wherein the polyamic acid has an average molecular weight of 10,000 to 150,000.

7. A polyimide film having a thickness of 40 to 120 μm produced by the method for producing a polyimide film according to claim 1.

8. A polyimide film having a thickness of 45 to 110 μm produced by the method according to claim 1.

9. A polyimide film having a thickness of 50 to 100 μm produced by the method according to claim 1.

10. A polyimide film produced by the method according to claim 5.

11. A polyimide film produced by the method according to claim 6.

12. A method for producing a polyimide film comprising:
forming a coating film on a base material, the coating film comprising a polyamic acid having a repeating unit represented by chemical formula (1),

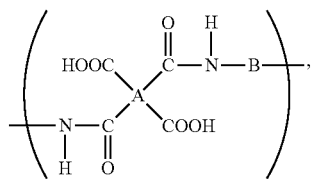

Chemical Formula (1)

wherein, in the polyamic acid having the repeating unit represented by the chemical formula (1),
85 mol % or more in 100 mol % of A is chemical formula (2) and/or chemical formula (3),
85 mol % or more in 100 mol % of B is chemical formula (4),
175 mol % or more in 200 mol % of A plus B is any of chemical formulas (2) to (4), and
6 to 25 mol % in 200 mol % of A plus B is any of chemical formulas (5) to (7),

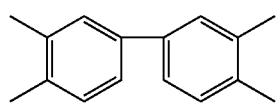

Chemical Formula (2)

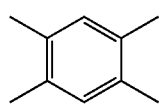

Chemical Formula (3)

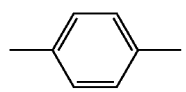

Chemical Formula (4)

Chemical Formula (5)

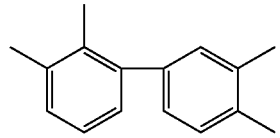

Chemical Formula (6)

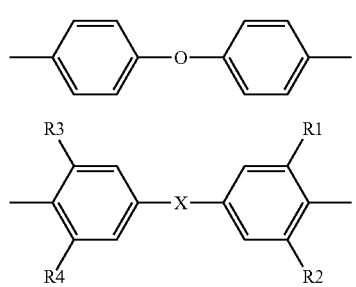

Chemical Formula (7)

and, in the chemical formula (7),
X is direct bonding or a divalent group,
R1 to R4 each are a substituent selected from hydrogen atom, a hydrocarbon group having 1 to 6 carbon atoms, hydroxyl group, carboxyl group, an alkoxy group having 1 to 6 carbon atoms, and a carboalkoxy group,
at least one of R1 and R2 is not hydrogen atom, and
at least one of R3 and R4 is not hydrogen atom;
heating the coating film formed on the base material, the coating film remaining coated on the base material during the heating; and
obtaining the polyimide film without foaming, the film having a thickness of 40 to 120 μm and having an elastic modulus of 1,000 MPa or more at a temperature of 400° C.

13. A polyamic acid solution composition comprising a polyamic acid having a repeating unit represented by chemical formula (1),

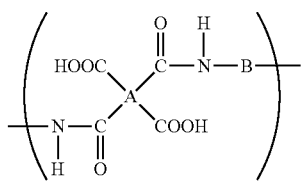

Chemical Formula (1)

wherein, in the polyamic acid having the repeating unit represented by the chemical formula (1),
85 mol % or more in 100 mol % of A is chemical formula (2) and/or chemical formula (3);
85 mol % or more in 100 mol % of B is chemical formula (4);
175 mol % or more in 200 mol % of A plus B is any of chemical formulas (2) to (4); and
6 to 25 mol % in 200 mol % of A plus B is any of chemical formulas (5) to (7);

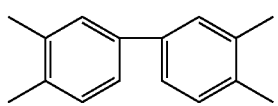

Chemical Formula (2)

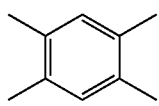

Chemical Formula (3)

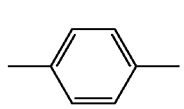

Chemical Formula (4)

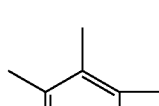

Chemical Formula (5)

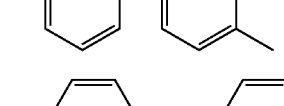

Chemical Formula (6)

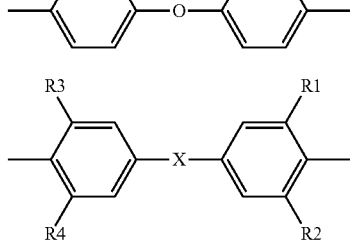

Chemical Formula (7)

and, in the chemical formula (7),
X is direct bonding or a divalent group;
R1 to R4 each are a substituent selected from hydrogen atom, a hydrocarbon group having 1 to 6 carbon atoms, hydroxyl group, carboxyl group, an alkoxy group having 1 to 6 carbon atoms, and a carboalkoxy group;
at least one of R1 and R2 is not hydrogen atom; and
at least one of R3 and R4 is not hydrogen atom,
the solution having solution stability and being capable of providing a polyimide film having a thickness of 40 to 120 µm without foaming by heating a coating film formed on a base material by coating, wherein the polyimide film thus provided has a water vapor permeation coefficient of 0.15 g·mm/m$^2$/24 hr or more and an elastic modulus of 1,000 MPa or more at 400° C.

* * * * *